United States Patent [19]
Sims

[11] Patent Number: 5,085,363
[45] Date of Patent: Feb. 4, 1992

[54] METHOD OF WELD REPAIRING OF A SECTION OF A METALLIC CYLINDRICAL MEMBER

[75] Inventor: John A. Sims, Concord, N.C.

[73] Assignee: Westinghouse Electric Corp., Pittsburgh, Pa.

[21] Appl. No.: 608,142

[22] Filed: Nov. 1, 1990

[51] Int. Cl.$^5$ ............................................. B23K 31/00
[52] U.S. Cl. ................... 228/119; 228/160; 29/402.16; 219/76.14
[58] Field of Search ............... 228/119, 160, 214, 215, 228/216; 29/402.16, 402.18, 402.19; 219/76.1, 76.14, 76.16

[56] References Cited

U.S. PATENT DOCUMENTS

| | | | |
|---|---|---|---|
| 3,349,463 | 10/1967 | Kittelson | 29/402.18 X |
| 4,663,554 | 1/1987 | Clark et al. | 29/156.4 |
| 4,808,055 | 2/1989 | Wertz et al. | 29/402.16 X |
| 4,826,071 | 5/1989 | Becker | 228/160 |
| 4,893,388 | 1/1990 | Amos et al. | 29/156.8 |
| 4,897,519 | 1/1990 | Clark et al. | 219/76.14 |
| 4,903,888 | 2/1990 | Clark et al. | 228/119 |

FOREIGN PATENT DOCUMENTS 99781 4/1989 Japan .................. 219/76.1

Primary Examiner—Richard K. Seidel
Assistant Examiner—Patty E. Hong

[57] ABSTRACT

A method of repairing a section of a metallic cylindrical member, such as a turbine shaft, having surface defects and a keyway thereon, by machining the surface to a depth less than the depth of the keyway and inserting a half key in the keyway, and machining the combination to provide a continuous surface for welding. A weld material is then deposited over the continuous surface formed to a thickness which provides a diameter greater than the initial diameter of the shaft. The weld material is machined to give a member having the initial diameter and the key member is removed to provide a repaired member having a keyway therein.

15 Claims, 3 Drawing Sheets

METHOD OF WELD REPAIRING OF A SECTION OF A METALLIC CYLINDRICAL MEMBER

BACKGROUND OF THE INVENTION

The present invention relates to a method of weld repairing of a section of a metallic cylindrical member, and more specifically, the weld repairing of a turbine or generator component, such as a rotor or extension shaft having a keyway therein, to remove surface defects or deviations.

During use, sections of various metallic cylindrical components of turbines and generators, such as rotors and the like, can incur surface defects or deviations of a superficial depth in the surface. Typical examples are shallow cuts, shallow surface indentations, fretting, or loss of fit with a mating part (such as an oil pump runner). A recent development for use in the repair of such metallic cylindrical components has been to weld repair the same. Shaft weld repairs to correct such defects require a continuous surface on the component. Such components are highly stressed parts, and the welds must be of the highest integrity.

Examples of weld repair of turbine or generator components are described in U.S. Pat. No. 4,663,554, U.S. Pat. No. 4,893,388, U.S. Pat. No. 4,897,519 and U.S. Pat. No. 4,903,888, all of which are assigned to the assignee of the present invention. The contents of these four patents are incorporated by reference herein.

There is, however, always a risk that residual stresses, resulting from a relatively thick weld-building on a shaft, for example, where the weld build-up is large relative to the shaft diameter, can cause "bowing" distortion of the shaft. Thus, as a general principal, it is described to keep the thickness of the weld small compared to the shaft diameter, so as to assure a safer and more predictable repair.

In those sections where the metallic cylindrical component has a slot or keyway, to tie the shaft into another component by use of a key fitted into the keyway, a particular problem exists in weld repair of the same when a welding machine is used that requires a continuous surface, or a common surface 360° about the shaft. In previous repairs of such a section containing a keyway, since a continuous 360° surface was required for welding, it was necessary to machine away the surface containing the defects and the keyway to a degree that the shaft was of a much smaller diameter than the initial diameter and completely remove the keyway. Such machining resulted in a small diameter shaft and a thick weld build-up, after weld repairing such that the weld becomes a large percentage of the cross-section of the shaft.

It is an object of the present invention to provide a method of weld repairing a section of a metallic cylindrical member containing a keyway without the need to machine out the keyway from the member.

It is another object of the present invention to provide a method of weld repairing a section of a metallic cylindrical member containing a keyway, such that the thickness of the weld is substantially reduced as compared to prior art weld repaired such sections.

SUMMARY OF THE INVENTION

A method of repairing a section of a metallic cylindrical member, such as a rotor or shaft of a turbine or generator, which has an initial diameter, to remove defects in the surface of the section, and which section has a keyway in the surface area thereof, includes an initial step of machining the surface of the section to a depth less than the depth of the keyway to remove the defects and provide a welding surface. A key member, of a metal that is weld compatible with the metal from which the cylindrical member is composed, is inserted into the keyway and the key member machined to provide a key member surface flush with the welding surface so as to provide a continuous 360° surface about the section of the metallic cylindrical member. The location of the key member in the cylindrical member is then recorded.

A weld metal is then deposited over the welding surface and the key member surface of the section to provide weld metal to an extent that the section of the cylindrical member with the weld metal thereon is larger in diameter than the initial diameter of the section. The weld metal is then machined to provide a section of the cylindrical member, having a machined layer of weld metal, of a diameter that is equal to the initial diameter. The key member is then removed from the keyway to provide a repaired section on the metallic cylindrical member that has a diameter equal the initial diameter and a keyway in the surface area thereof.

DESCRIPTION OF THE DRAWINGS

The invention will become more readily apparent from the following description of a preferred embodiment thereof shown, by way of example only, in the accompanying drawings, wherein.

DETAILED DESCRIPTION

Figure 1:
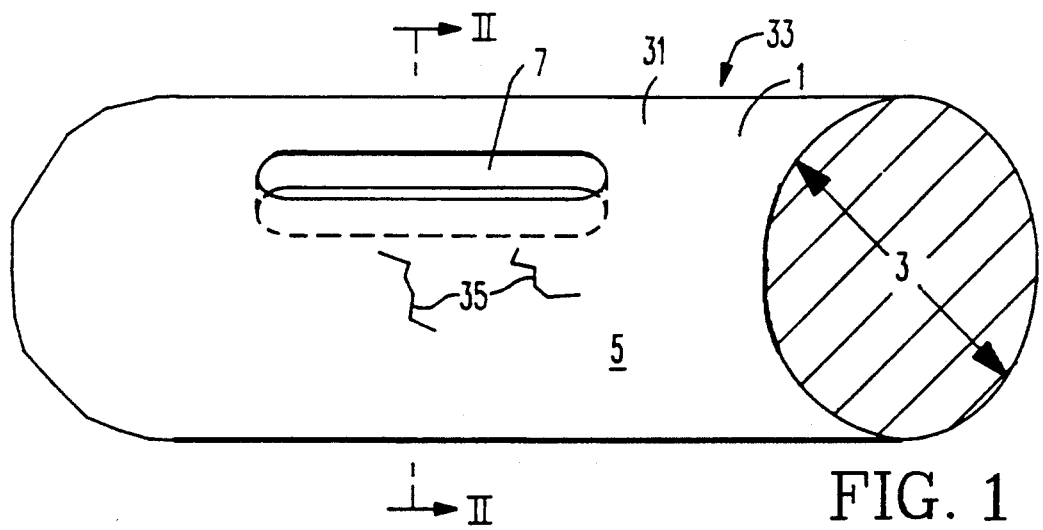
FIG. 1 illustrates a shaft having surface deformities therein to which the present method may be applied to repair the same.
Figure 2:
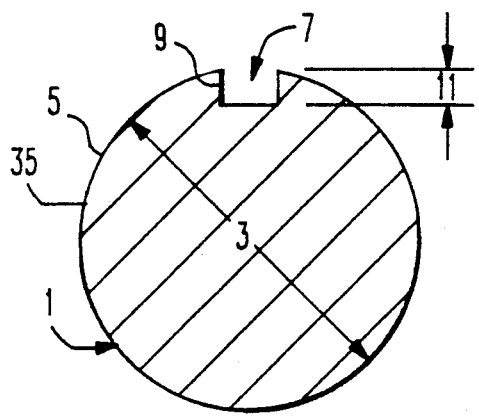
FIG. 2 is a cross-section taken through lines II—II of FIG. 1.

FIGS. 1 and 2 illustrates a cross-section of a metallic shaft 1 having an initial diameter 3, a surface 5 having defects thereon, and a keyway 7 formed in the surface area 9 of the shaft, the keyway having a depth 11.

Figure 3:
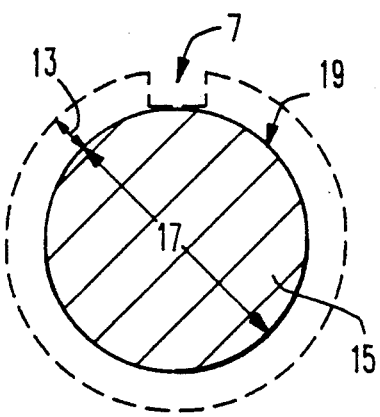
FIGS. 3-6 illustrates a prior art method of repairing a shaft, the present method being an improvement thereover.
Figure 4:
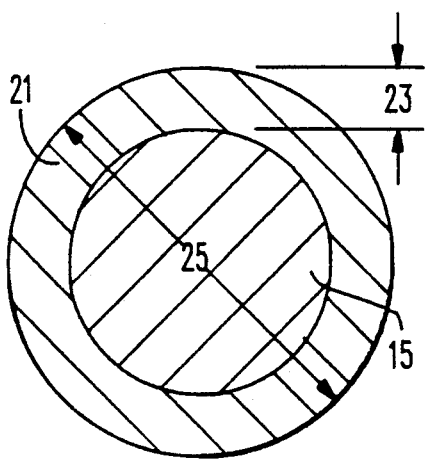
Figure 5:
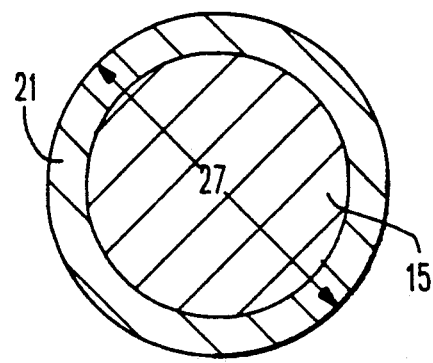
Figure 6:
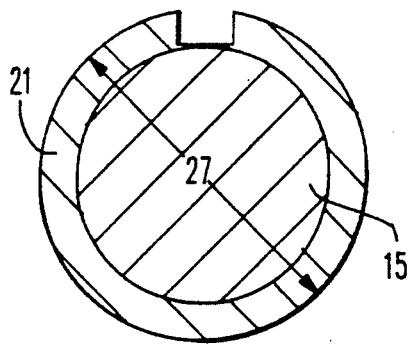

To remove the surface defects by a prior.art method, illustrated in FIGS. 3-6, the shaft 1 was machined to a depth 13, which was at least as great as the depth of the keyway 11, resulting in a smaller shaft 15 having a diameter 17. In FIG. 3, the original diameter 3 of the shaft 1 is indicated in dashed lines, as is the keyway 7, which has been removed. The smaller diameter shaft 15 has a continuous outer surface 19 for deposition of weld metal. Weld metal 21 was next deposited on the surface 19 of the shaft 15 to a thickness 23 that provides a diameter 25 that was greater than the initial diameter 3 of the shaft, as illustrated in FIG. 4. Machining of the weld metal 21 was then carried out to provide a smaller diameter shaft 15 with a weld build-up of weld metal 21 thereon, as shown in FIG. 5, the final diameter 27 of the machined unit being equal to the initial diameter 3 of the metallic shaft 1, and having a smooth surface without the previous defects. To complete the repair process, it was then necessary to form a new keyway 29 in the weld build-up, as shown in FIG. 6, the new keyway 29 being of a size and depth equal to the original keyway 7.

In using this prior art process, a relatively large weld build-up of weld metal 21 was required on the reduced diameter shaft 15. A risk of residual stresses resulting from a relatively thick weld build-up, which can cause distortion of the shaft, results from this prior art process where the continuous 360° surface formation resulted in a small shaft for welding and a thick weld build-up.

The method of the present invention, schematically illustrated in FIGS. 7-13, provides for the repair of sections of a metallic cylindrical element without the need for machining the section to a diameter such as to remove the keyway and does not require a thick weld build-up relative to the shaft diameter. The machining of the shaft section required by the present method is only to an extent that sufficiently removes the surface defects and less than the depth of the keyway.

Returning to FIGS. 1 and 2, these figures show a section 31 of a metallic cylindrical member 33, of a diameter 3, such as a shaft 1 that has defects, illustrated as cracks 35, in the surface 5. The section 31 of the metallic cylindrical member 33 has a keyway 7 formed therein, of a depth 11, in the surface area 9 of the metallic cylindrical member 33. The surface defects, in addition to shallow cracks may be a member with a slightly undersized or worn condition, fretting, gouges, or the like.

The present method is especially useful in repairing metallic cylindrical members such as turbine and generator components such as rotors or extension shafts. The metallic composition of such components may comprise AISI 1040 steel for extension shafts of a steam turbine generator; or low alloy components such as high pressure steam turbines rotors composed of a CR-MO-V ferrous alloy, which may contain an intermediate pressure section; or low alloy components such as low pressure steam turbine rotor composed of NI-CR-MO-V ferrous alloy. As representative of the components, such extension shafts may be 5-10 feet (1.52-3.05 m) long and 5-8 inches (12.7-20.32 cm) in diameter, while high pressure steam turbine rotors may be 35-40 inches (88.9-101.6 m) in diameter and low pressure steam turbine rotors may be 18-20 inches (45.72-50.8 cm) in diameter, and of varied lengths.

Figure 7:
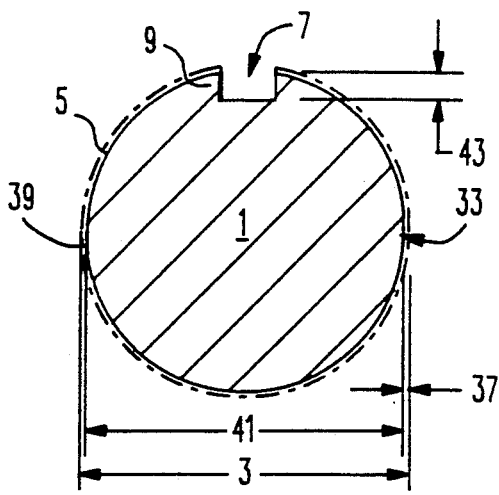
FIG. 7 is a cross-section similar to FIG. 2 showing the shaft after machining to remove surface cracks.
Figure 8:
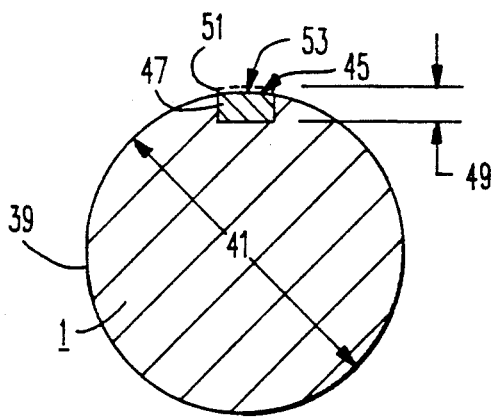
FIG. 8 shows the placement of a key member in the machined shaft with machining of the key member to provide a continuous surface.

In the present method for repairing the section 31 of the metallic cylindrical member 33, such as shaft 1, the surface 5 of the shaft 1, indicated by dashed lines in FIG. 7, is mechanically removed by grinding, machining, or the like, to a depth 37 only sufficient to remove the surface cracks the depth 37 being less, and preferably substantially less, than the depth of the original keyway 7, to provide a crack-free welding surface 39 on the shaft 1. The shaft 1, after machining has a diameter 41 that is smaller than the initial diameter 3 of the shaft, and the keyway 7 has a new depth 43 slightly less than the original depth 11. A key member 45, such as a half key 47, which is of a thickness 49, slightly larger than the new depth 43 of the keyway is inserted into the keyway. The key member 45 is of a length and width sufficient to frictionally secure the key member 45 in the keyway 7, although a tack weld or other means for securing the key member therein may be used.

The key member 45 is of a metallic composition that is weld compatible with the metallic composition of the shaft 1, and preferably is of an identical composition. As well known by those skilled in the art of welding, weld compatibility is used to describe materials that are metallurgically compatible, such that they do not have significant differences with respect to weldability and a welding arc does not change appreciably going from one metal to a weld compatible metal. The exposed end surface 51 of the key member, shown as a dotted line in FIG. 8, if extending from the keyway, is mechanically removed, such as by machining, to provide a key member surface 53 that is flush with the welding surface 39 of the shaft 1 to provide a continuous surface about the shaft 1. The location of the keyway 7 and machined key member 45 are recorded, such as by scribing or otherwise marking the location on a portion of the shaft that is not being repaired.

Figure 9:
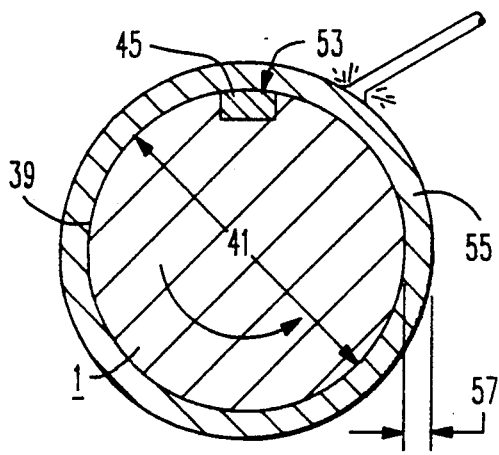
FIG. 9 illustrates the deposition of weld metal over the continuous surface of the shaft and key member.
Figure 10:
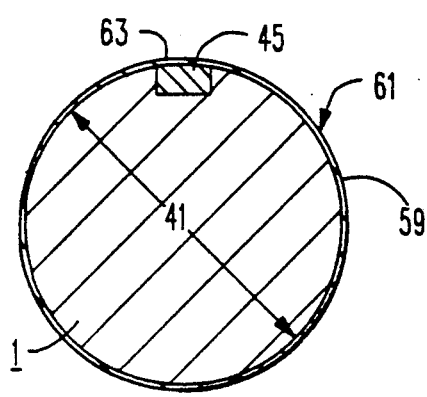
FIG. 10 illustrates the shaft after machining of the weld material to provide a layer of weld metal over the shaft and key member.
Figure 11:
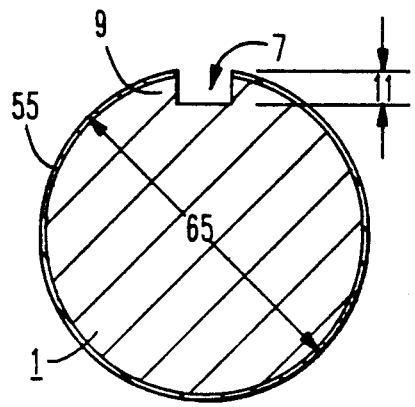
FIG. 11 shows the repaired shaft after removal of the key member.

After provision of the continuous surface comprising welding surface 39 and key member surface 53, a weld metal 55 is deposited over the section 31 that is being repaired, with the shaft preferably rotated during the deposition of the weld metal (FIG. 9). After weld deposition, the weld metal or heat affected zones may be heat treated and stress relieved as is done with conventional weld repairs. The depositing step of weld metal can consist of welding a ferrous alloy to the continuous surface by any one of gas tungsten arc welding, plasmaarc welding, electron beam welding, laser beam welding and gas metal arc welding. Other welding processes may be used but minimization of the heat affected zone in the base metal should be effected to avoid unnecessary defects. Gas tungsten arc welding may be preferred for the reasons discussed in aforementioned U.S. Pat. No. 4,903,888, which is unincorporated by reference herein. The selection of the weld deposition method depends on factors such as distortion, nondestructive testing acceptance limits and mechanical property response to the post weld heat treatment, as discussed in said patent. The weld metal 55 is deposited to an extent that the diameter 41 of the machined shaft 1, plus the thickness 57 of the weld metal is slightly larger, such as about 0.4 inch (1.02 cm) greater, than the initial diameter 3 of section 31. Machining of the weld metal 55 is then carried out so as to provide a smooth surface over the shaft 1 of a machined layer 59 of weld metal with the sum of the diameter 41 and the machined layer 59 of weld metal providing a repaired outer surface 61 on the shaft, with the repaired section being equal in diameter to the initial diameter 3. As shown in FIG. 10, the machining of the weld metal 55, to give a diameter to the repaired shaft equal to the initial diameter 3, will result in a portion 63 of the machined layer 59 of weld metal 55 over the key member 45. The initial diameter may include a slightly larger diameter in instances where wear or other components require a slightly larger diameter. The layer 63 and key member 45 are then removed, such as by machining, to provide the repaired section of the cylindrical member, as shown in FIG. 11. The repaired section has a diameter 65 equal to the initial diameter 3, and keyway 7, which has depth 11, with the section now comprising a shaft of reduced diameter 41 having the layer 59 of weld metal 55 completely thereover. In those instances where the machining out of the key member results in a slightly larger keyway, it is only necessary to use a slightly larger key in the resultant use of the metallic cylindrical member.

Figure 12:
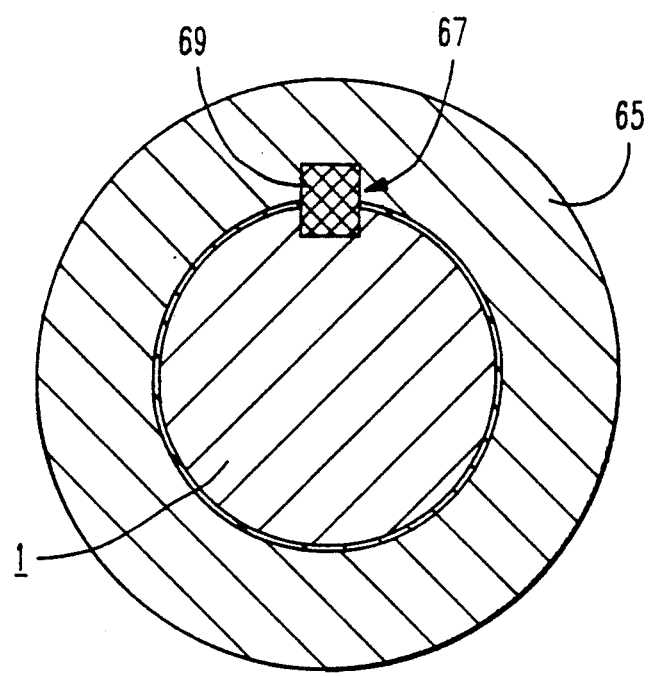
FIG. 12 illustrates a repaired shaft engaged with a sleeve by a key.

FIG. 12 illustrates the cooperation of a shaft 1, repaired in accordance with the present method engaged with a sleeve 65 having a keyway 67, by means of a key 69.

Figure 13:
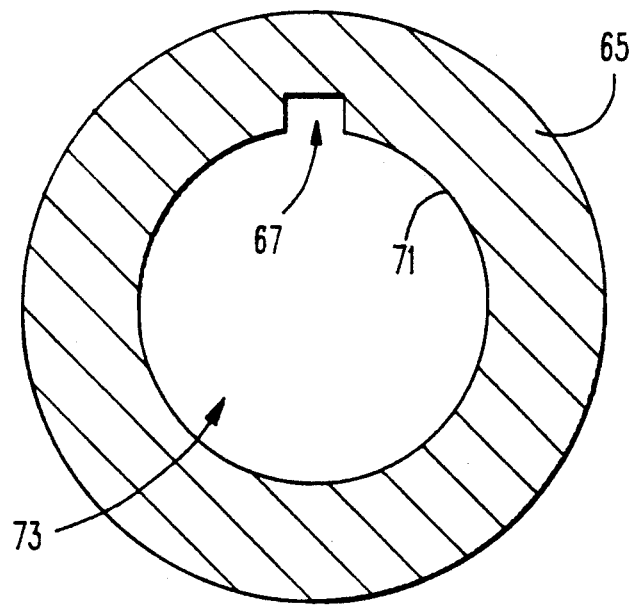
FIG. 13 illustrates a metallic cylindrical member in the form of a sleeve that may be repaired using the present invention.

The present method, in addition to being usable with metallic cylindrical members, such as shafts, is also usable with metallic cylindrical members such as sleeves or collars 65, schematically illustrated in FIG. 13 with the keyway 67 formed in the inner surface 71 of the cylindrical member facing a bore 73 through the cylindrical member. The steps of the method would be the same as those used in the method illustrated in FIGS. 7-11, except that inner surface 71 is repaired. The present method may be particularly useful for repairing an inner surface facing a bore through a metallic cylindrical member since the expansion of the bore of shaft mounted parts (due to the centrifugal force of rotation) often prevents the use of chrome plating to restore the bore diameter, since chrome is subject to flaking.

The present method thus provides for weld repair of a section of a metallic cylindrical member in a manner which reduces the risk of distortion of the cylindrical member by the deposit of the weld material, since only a minimal amount of the surface area of the metallic member need be removed and less weld material deposited. The present method also reduces the welding time, since only a relatively thin weld metal deposition is necessary compared to prior art methods.

What is claimed is:

1. A method of weld repairing a section of a metallic cylindrical member having an initial diameter to remove defects in the surface thereof, which section has a keyway in the surface area thereof comprising:

mechanically removing the surface of said section of said cylindrical member, to a depth less than the depth of said keyway, to remove the surface defects and provide a welding surface;

inserting a key member, of a material that is weld compatible with the metallic material of the section of the cylindrical member, in said keyway to provide a key member surface flush with said welding surface;

recording the location of said keyway in said cylindrical member;

depositing a weld metal over said welding surface and said key member surface to provide weld metal thereon, such that the section of the cylindrical member with said weld metal is larger in diameter than said initial diameter;

machining said weld metal to provide a layer of weld metal on the section of the cylindrical member of a diameter equal to said initial diameter; and removing the key member from said keyway to provide a repaired section of the cylindrical member of said initial diameter having said keyway in the surface area thereof.

2. The method of weld repairing a section of a metallic cylindrical member as defined in claim 1, wherein the outer surface of said cylindrical member has defects thereon and the keyway in the surface area adjacent said outer surface.

3. The method of weld repairing a section of a metallic cylindrical member as defined in claim I, wherein said cylindrical member has a bore therethrough and an inner surface facing said bore, with the defects being in said inner surface and the keyway in the surface area adjacent said inner surface.

4. The method of weld repairing a section of a metallic cylindrical member as defined in claim 1, wherein said key member, when inserted into said keyway, initially has an exposed end surface extending from the keyway, and said exposed surface is mechanically removed to provide said key member surface flush with said welding surface.

5. The method of weld repairing a section of a metallic cylindrical member as defined in claim 4, wherein the mechanical removing of said surface of said section and of said portion of said key member is by machining.

6. The method of weld repairing a section of a metallic cylindrical member as defined in claim 1, wherein said metallic cylindrical member is an extension shaft of a steam turbine.

7. The method of weld repairing a section of a metallic cylindrical member as defined in claim 6, wherein said extension shaft is composed of a metal selected from the group consisting of an AISI 1040 steel and a CR-MO-V ferrous alloy.

8. The method of weld repairing a section of a metallic cylindrical member as defined in claim 1, wherein said metallic cylindrical member is a high pressure steam turbine rotor.

9. The method of weld repairing a section of a metallic cylindrical member as defined in claim 8, wherein said high pressure steam turbine is composed of a Cr-Mo-V ferrous alloy.

10. The method of weld repairing a section of a metallic cylindrical member as defined in claim 1, wherein said metallic cylindrical member is a low pressure steam turbine rotor.

11. The method of weld repairing a section of a metallic cylindrical member as defined in claim 10, wherein said low pressure steam turbine rotor is composed of a Ni-Cr-Mo-V ferrous alloy.

12. The method of weld repairing a section of a metallic cylindrical member as defined in claim 1, wherein said depositing of weld metal over said welding surface and said key member is carried out by a gas tungsten arc welding, plasma-arc welding, electron beam welding, laser beam welding, or gas metal arc welding process.

13. The method of weld repairing a section of a metallic cylindrical member as defined in claim 1, wherein said key member is of a metallic composition identical to the metallic composition of said metallic cylindrical member.

14. A method of weld repairing a section of a metallic cylindrical shaft having an initial diameter to remove defects in the outer surface thereof, which section has a keyway in the surface area thereof comprising:

mechanically removing the surface of said section of said cylindrical shaft, to a depth less than the depth of said keyway, to remove the surface defects and provide a welding surface;

inserting a key member, of a material that is weld compatible with the metallic material of the section of the cylindrical shaft, in said keyway, which key member has an exposed end surface extending from the keyway;

mechanically removing said exposed surface to provide a key member surface flush with said welding surface;

recording the location of said keyway in said cylindrical shaft;

depositing a weld metal over said welding surface and said key member surface to provide weld metal thereon, such that the section of the cylindrical shaft with said weld metal is larger in diameter than said initial diameter;

machining said weld metal to provide a layer of weld metal on the section of the cylindrical shaft of a diameter equal to said initial diameter; and removing the key member from said keyway to provide a repaired section of the cylindrical shaft of said initial diameter having said keyway in the surface area thereof.

15. A method of weld repairing a section of a metallic cylindrical sleeve having an initial diameter to remove defects in the surface thereof, which section has a bore therethrough and an inner surface facing said bore, with the defects in said inner surface, and a keyway in the surface area adjacent said inner surface comprising:

mechanically removing the surface of said section of said cylindrical shaft, to a depth less than the depth of said keyway, to remove the surface defects and provide a welding surface;

inserting a key member, of a material that is weld compatible with the metallic material of the section of the cylindrical sleeve, in said keyway, which key member has an exposed end surface extending from the keyway;

mechanically removing said exposed surface to provide a key member surface flush with said welding surface;

recording the location of said keyway in said cylindrical sleeve;

depositing a weld metal over said welding surface and said key member surface to provide weld metal thereon, such that the section of the cylindrical sleeve with said weld metal is larger in diameter than said initial diameter;

machining said weld metal to provide a layer of weld metal on the section of the cylindrical sleeve of a diameter equal to said initial diameter; and removing the key member from said keyway to provide a repaired section of the cylindrical sleeve of said initial diameter having said keyway in the surface area thereof.

* * * * *